United States Patent [19]
O'Brien et al.

[11] Patent Number: 5,949,177
[45] Date of Patent: Sep. 7, 1999

[54] LINEAR PIEZOELECTRIC MOTOR EMPLOYING INTERNAL FEEDBACK

[75] Inventors: Michael J. O'Brien, Rochester; Robert C. Bryant, Honeoye Falls, both of N.Y.

[73] Assignee: Eastman Kodak Company, Rochester, N.Y.

[21] Appl. No.: 09/004,048

[22] Filed: Jan. 7, 1998

[51] Int. Cl.⁶ .................................................. H01L 41/08
[52] U.S. Cl. .............................. 310/316.01; 310/316.02; 310/323.02; 318/116
[58] Field of Search ..................... 310/316.01, 316.02; 318/116

[56] References Cited

U.S. PATENT DOCUMENTS

| | | | |
|---|---|---|---|
| 4,658,172 | 4/1987 | Izukawa | 310/316.02 |
| 4,888,514 | 12/1989 | Takahashi et al. | 310/316.02 |
| 4,939,402 | 7/1990 | Hirayama et al. | 310/316.02 |
| 5,192,889 | 3/1993 | Myohga | 310/316.02 |
| 5,453,653 | 9/1995 | Zumeris | 310/316.02 |
| 5,616,979 | 4/1997 | Nishikawa | 310/316.02 |
| 5,616,980 | 4/1997 | Zumeris | 310/316.02 |

FOREIGN PATENT DOCUMENTS 405153788   6/1993   Japan ..................... 310/316.02

*Primary Examiner*—Mark O. Budd
*Attorney, Agent, or Firm*—Mark G. Bocchetti; Edward Dugas

[57] ABSTRACT

A piezoelectric motor system is formed with a piezoelectric motor incorporating an element that is physically displaced as a function of an applied voltage resulting in the generation of a back electromotive force. The system incorporates a controller having an output connected to the piezoelectric motor. The controller receives a direction signal indicating the desired drive direction of the piezoelectric motor and a velocity signal indicating the desired velocity of the piezoelectric motor. The controller provides a drive voltage for driving the piezoelectric motor in the desired drive direction. An electrical equivalent circuit that mirrors the electrical characteristics of the piezoelectric motor is connected to receive the drive voltage from the controller. A comparator provides a difference signal indicative of the difference in voltage developed across the piezoelectric motor and the voltage developed across the electrical equivalent circuit. An integrating circuit receives the difference signal and provides a feedback signal to the controller. The difference signal is compared with the velocity signal to either increase or decrease the drive voltage applied to the piezoelectric motor so as to cause the piezoelectric motor to achieve the desired velocity.

6 Claims, 4 Drawing Sheets

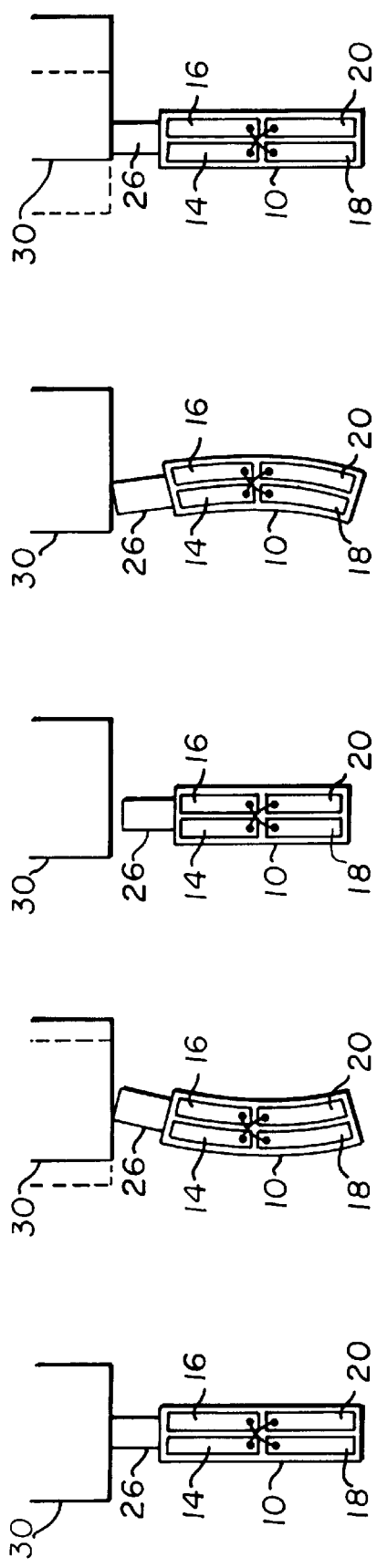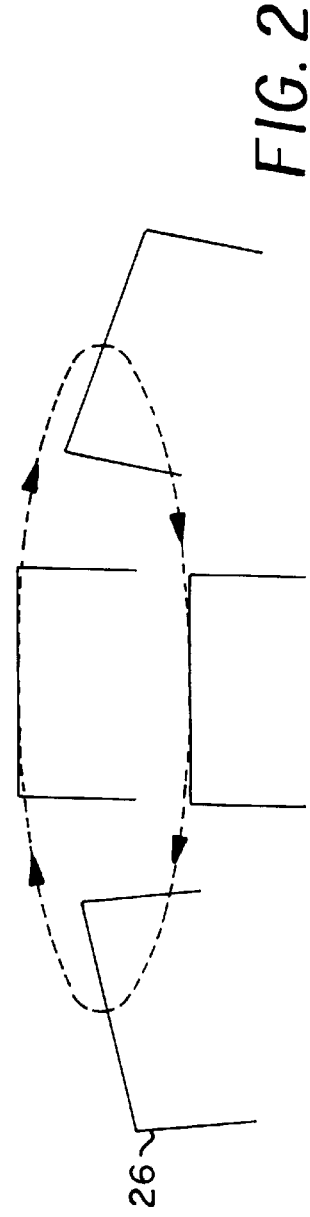

LINEAR PIEZOELECTRIC MOTOR EMPLOYING INTERNAL FEEDBACK

FIELD OF THE INVENTION

The invention relates generally to the field of linear motors and in particular to a piezoelectric motor using feedback.

BACKGROUND OF THE INVENTION

Linear vibratory type motors that generally operate upon piezoelectric principals are receiving wider use in areas where small size and low current drain is desired. One application of this invention is in the field of movement of web material where the invention controls web tension and/or velocity values within acceptable ranges. Generally this is accomplished by the use of a feedback device or circuit in conjunction with a controller. An example of such a system is set forth in U.S. Pat. No. 5,616,979, entitled "Vibration Driven Motor Apparatus" by Nishikawa. The invention of that patent is a rotational device called a traveling wave motor that uses external optical encoder for position of the motor's output shaft. The output from the encoder is fed to an up/down counter and is compared with a reference value. Deviation of the output signal from the reference value is used as an error signal that is fed back to a VCO to provide to the motor a corrected drive signal that causes the motor to change its rotational velocity.

In certain applications the aforementioned technique of providing velocity control to a motor is not adequate in that not all vibratory motors are traveling wave motors. In addition, in certain applications the expense associated with using, for example, discrete velocity sensors is not justified by cost, size, and weight constraints. The present invention is directed to a low cost, relatively simple solution that provides velocity control for linear vibratory type motors.

SUMMARY OF THE INVENTION

Velocity feedback is derived from the excess charge (back electromotive force) developed across a linear piezoelectric motor due to its deformation during operation. The difference between a pure resonant circuit (mirror circuit) and that of the motor's resonant circuit provides a signal proportional to the velocity of the motor's movable tip.

The present invention is directed to overcoming one or more of the problems set forth above. Briefly summarized, according to one aspect of the present invention there is provided a piezoelectric motor system, comprising:

a piezoelectric motor incorporating an element that is physically displaced as a function of an applied voltage resulting in the generation of a back electromotive force;

controller means having an output connected to said piezoelectric motor, said controller receiving a direction signal indicating the desired drive direction of the piezoelectric motor and a velocity signal indicating the desired velocity of the piezoelectric motor, said controller providing a drive voltage for driving said piezoelectric motor in the desired drive direction;

an electrical equivalent circuit that mirrors the electrical characteristics of said piezoelectric motor connected to receive the drive voltage from said controller;

comparison means for providing a difference signal indicative of the difference in voltage developed across said piezoelectric motor and the voltage developed across said electrical equivalent circuit; and integrating means for receiving the difference signal and for providing a feedback signal to said controller that is compared with the velocity signal to either increase or to decrease the drive voltage applied to said piezoelectric motor so as to cause the piezoelectric motor to achieve the desired velocity.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages:

Low noise due to the use of integrating circuitry;

Provides a more accurate measure of velocity than heretofore available for these size devices;

The system is designed to automatically compensate itself for aging effects; and Lack of external feedback elements reduces physical size.

BRIEF DESCRIPTION OF THE DRAWINGS

FIGS. 1A through 1E illustrate operating positions of the linear motor incorporated into the present invention;

FIG. 2 is a diagram illustrating the motion of the tip of the linear motor shown in FIG. 1;

To facilitate understanding, identical reference numerals have been used, where possible, to designate identical elements that are common to the figures.

DETAILED DESCRIPTION OF THE INVENTION

FIGS. 1A through 1E illustrate the movement of the ceramic tip 26 of a linear piezoelectric motor 10 that is activated by the application of potentials to surface electrodes 14, 16, 18 and 20. In FIG. 1A the motor is shown in the rest or non-excitation state with the ceramic tip 26 in contact with the surface of an object 30 that is to be moved. In FIG. 1B the motor is activated with a drive signal that causes the motor to bend to the right in turn causing the object 30 to move to the right. In FIG. 1C the motor has contracted pulling the ceramic tip from the surface of object 30. In FIG. 1D the motor is flexed to the left and extended to its original length which causes the ceramic tip 26 to contact the surface of object 30 urging it further to the right.

FIG. 2 illustrates the path of the ceramic tip 26 as it goes through the cycle of operation illustrated in FIGS. 1A through 1E. Note that the trajectory of the tip is elliptical. The linear piezoelectric motor 10 and its operation are set forth in more detail in U.S. Pat. Nos. 5,616,980 and 5,453,653.

Figure 3:
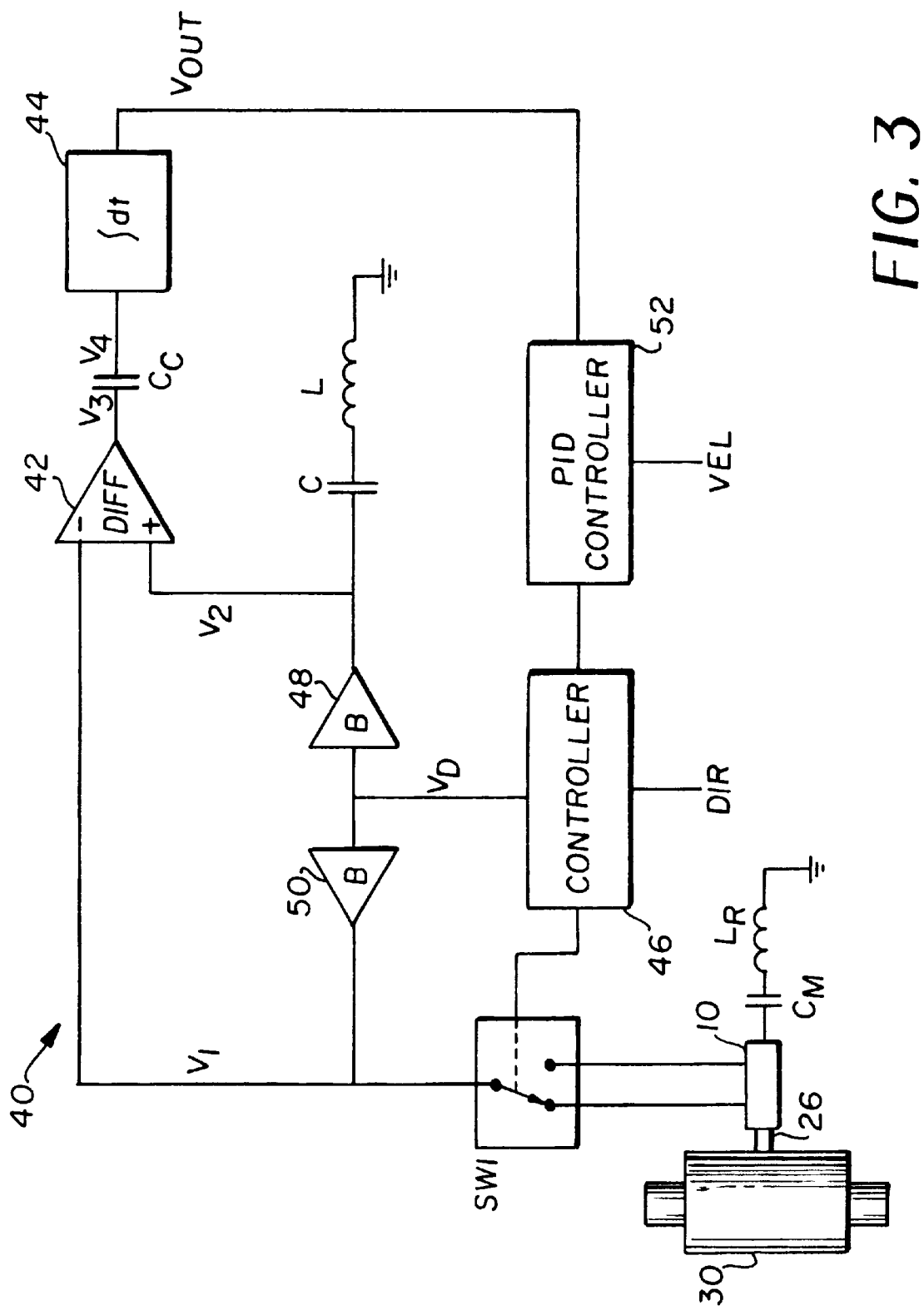
FIG. 3 is a perspective schematic diagram illustrating the linear motion of FIGS. 1A through 1E in circuit connection to form the preferred embodiment of the invention.
Figure 4:
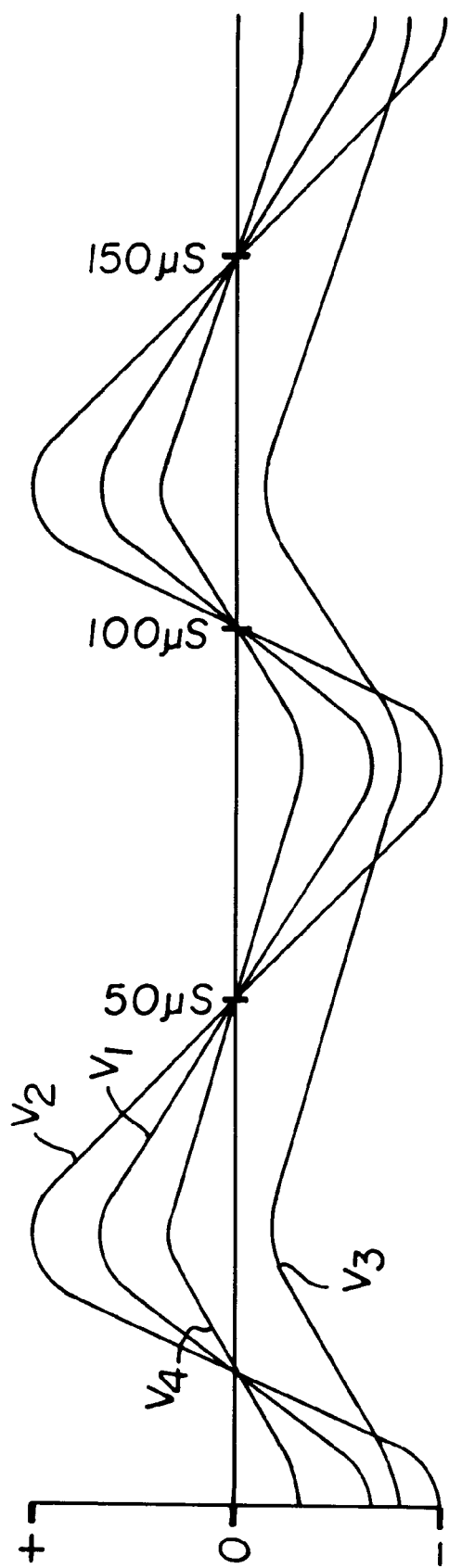
FIG. 4 is a chart illustrating voltage values occurring at locations marked on the circuit of FIG. 3.

In FIG. 3, the linear piezoelectric motor 10 is shown driving an object 30, which object is a roller. The velocity feedback circuit 40 for the linear piezoelectric motor 10 is based on the back electromotive force (EMF) that is developed as the linear piezoelectric motor 10 bends. A voltage, back EMF, is developed in the body of the linear piezoelectric motor 10 that is proportional and opposite to the strain caused in the linear piezoelectric motor 10 by the drive voltage $V_D$ which is the output of a controller 46. The linear piezoelectric motor 10 is connected to the feedback circuit 40 at the output of a buffer 50 and at the negative input to a differential amplifier 42. The voltage $V_D$, from the controller 46 is directed to an input to the linear motor via buffer 50 and switch SW1 and to the input of buffer 48. Buffer 50 drives the linear piezoelectric motor 10. Buffer 50 feeds a series resonant circuit formed by the equivalent capacitance of the linear piezoelectric motor 10 designated $C_M$ and an inductor $L_R$ which circuit forms a tank circuit that produces at resonance a voltage $V_1$ across the linear piezoelectric motor 10 of nearly 100V with only a 30V input. The voltage $V_1$ is modified by the fact that the linear piezoelectric motor 10 creates a back EMF which subtracts from the drive voltage $V_D$. The back EMF is proportional to the acceleration of the motor's ceramic tip 26. Buffer 48 drives a series tank circuit made up of L and C which is equivalent (mirrors) to the load seen by buffer 50, hence producing a proportional in-phase output voltage $V_2$ across that circuit. The difference amplifier 42 subtracts $V_1$ from $V_2$ resulting in an output voltage $V_3$ which is proportional to the acceleration of the motor's ceramic tip, plus a DC component due to circuit offsets. The DC component is removed by coupling capacitor $C_C$, making $V_4$ proportional to the acceleration of the ceramic motor tip. Typical voltages (the differences are greatly exaggerated for clarity) are shown in FIG. 4. The integrator 44 produces an output voltage $V_{OUT}$ that is proportional to the ceramic motor tip's velocity.

The controller 46, in the preferred embodiment may be an Anorad PCLM that receives its input from a PID controller 52 such as an Anorad PC-SERV controller which takes the velocity output signal $V_{OUT}$ and a settable velocity signal and determines the difference between the two which is an error signal. If the motor is at the set velocity, the error signal would be minimal (zero) and no adjustment would be necessary. The error signal results in a command signal being forwarded to the controller 46. The controller 46 receives the command signal and a selected direction signal which through switch SW1 controls the direction of rotation of the roller 30 and through buffer 50, the magnitude of the drive voltage $V_D$.

Figure 5:
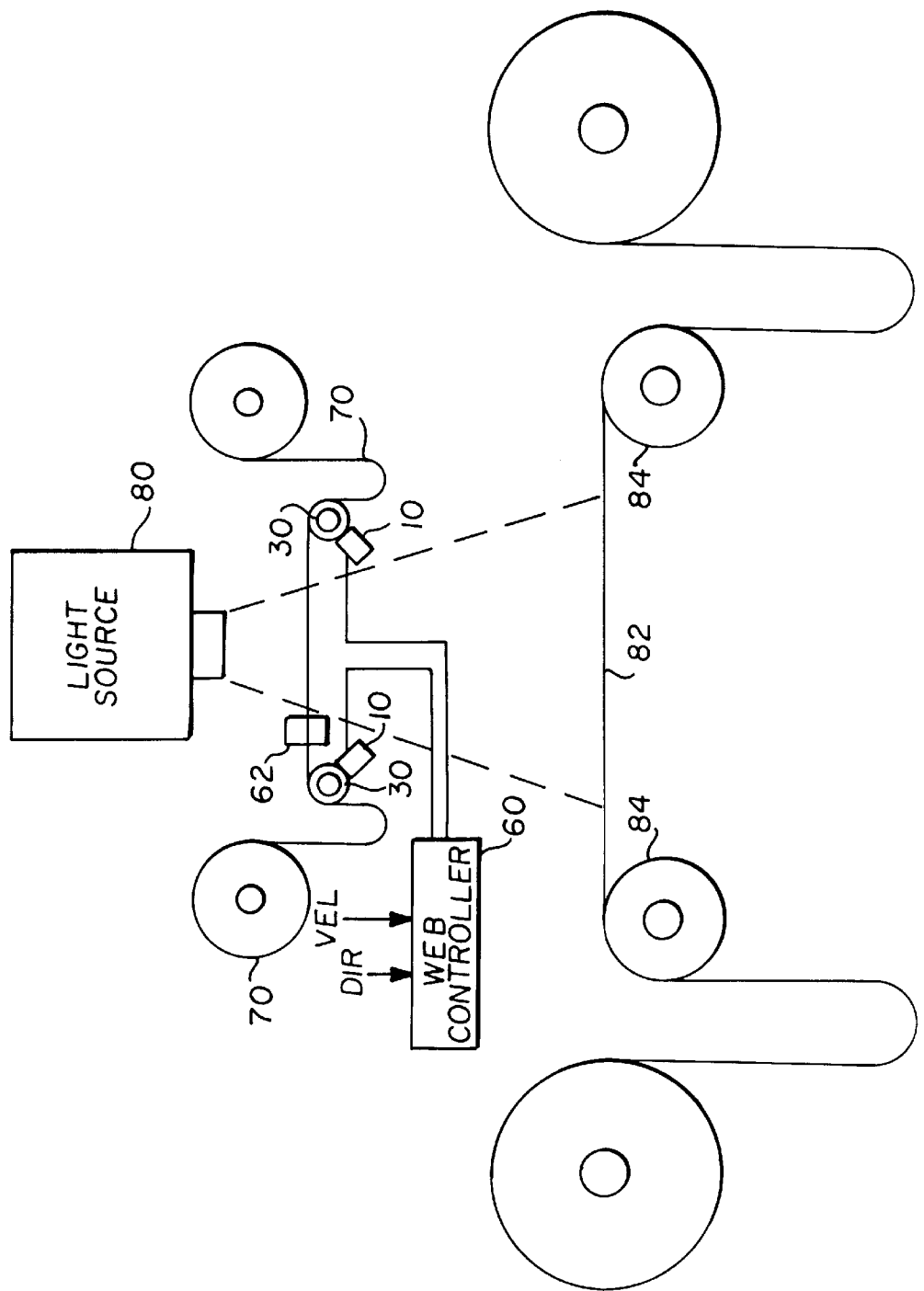
FIG. 5 is a diagram of a system wherein the present invention finds particular utility.

Referring now to FIG. 5, the present invention finds particular utility in a film negative printing system wherein the negative strip or roll 70 has a stripe of magnetic material running along its length. To process this type of negative strip correctly it is desirable to hold the motion of the strip to a constant velocity such that a set of magnetic read heads 62 can accurately read the data recorded on the negative's magnetic stripe. A web controller 60 is shown controlling two drive rollers 30 and receiving as inputs the direction signal DIR and the selected velocity signal VEL. A light source 80 illuminates a roll of print paper 82 through the frames of the negative strip 70 to form an image. The negative 70 and the print paper 82 are then advanced to the next frame where exposure again takes place. Advancement of the print paper 82 is accomplished by means of rollers 84. The process is repeated until the roll of print paper is exhausted or until the negative roll is exhausted.

The invention has been described with reference to a preferred embodiment; However, it will be appreciated that variations and modifications can be effected by a person of ordinary skill in the art without departing from the scope of the invention.

Parts List 10 linear piezoelectric motor
14 surface electrode
16 surface electrode
18 surface electrode
20 surface electrode
26 ceremic tip
30 (object) roller
40 velocity feedback circuit
42 differential amplifier
44 integrator
46 controller
48 buffer
50 buffer
52 PID controller
60 web controller
62 magnetic read head
70 film negative strip or roll
80 light source
82 print paper
84 rollers

What is claimed is:

1. A piezoelectric motor system, comprising:
    a piezoelectric motor incorporating an element that is physically displaced as a function of an applied voltage resulting in the generation of a back electromotive force;
    controller means having an output connected to said piezoelectric motor, said controller receiving a direction signal indicating the desired drive direction of the piezoelectric motor and a velocity signal indicating the desired velocity of the piezoelectric motor, said controller providing a drive voltage for driving said piezoelectric motor in the desired drive direction;
    an electrically equivalent circuit that mirrors the electrical characteristics of said piezoelectric motor connected to receive the drive voltage from said controller;
    comparison means for providing a difference signal indicative of the difference in voltage developed across said piezoelectric motor and the voltage developed across said electrical equivalent circuit; and
    integrating means for receiving the difference signal and for providing a feedback signal to said controller that is compared with the velocity signal to either increase or to decrease the drive voltage applied to said piezoelectric motor so as to cause the piezoelectric motor to achieve the desired velocity.

2. The piezoelectric motor system according to claim 1 and further comprising:
    a pair of buffer means, one for connecting the drive voltage from said controller means to said piezoelectric motor and the other for connecting the drive voltage to said electrically equivalent circuit means.

3. The piezoelectric motor system according to claim 1 and further comprising: a capacitor for coupling the difference signal to said integrating means for eliminating direct current components from entering the input to said integrating means.

4. A piezoelectric motor system comprising:
    a linear piezoelectric motor having a member that bends with the application of a voltage and generates a back electromotive force;
    a mirror circuit that mirrors the electrical characteristics of the linear piezoelectric motor;
    a controller for applying a drive voltage to said linear piezoelectric motor for driving the motor at a selected velocity; and
    feedback means for detecting the voltage difference between the voltage developed across the linear piezoelectric motor and the mirror circuit which voltage difference is a function of the velocity of the linear piezoelectric motor, and for providing a driving signal to said controller for increasing or decreasing the drive voltage so as to cause the linear piezoelectric motor to drive at the selected velocity.

5. The piezoelectric motor system according to claim 4 and further comprising:

a pair of buffer means, one for connecting the drive voltage from said controller to said linear piezoelectric motor and the other for connecting the drive voltage to said mirror circuit.

6. The piezoelectric motor system according to claim 4 and further comprising:

an integrating means: and a capacitor for coupling the difference signal to said integrating means for eliminating direct current components from entering the input to said integrating means.

\* \* \* \* \*